United States Patent [19]

Wakamatsu et al.

[11] Patent Number: 4,922,272
[45] Date of Patent: May 1, 1990

[54] HIGH PRECISION IMAGE RECORDING APPARATUS

[75] Inventors: Kazuhiro Wakamatsu; Seiji Yonekura; Mitsuo Suzuki; Hiroyuki Tadokoro; Atsuo Suzuki, all of Hitachi, Japan

[73] Assignees: Hitachi, Ltd., Tokyo; Hitachi Setsubi Engineering Co., Ltd., Ibaraki, both of Japan

[21] Appl. No.: 386,695

[22] Filed: Jul. 31, 1989

[30] Foreign Application Priority Data

Aug. 5, 1988 [JP] Japan .................. 63-194440

[51] Int. Cl.$^5$ ............................................ G01D 15/00
[52] U.S. Cl. ................................. 346/160; 346/153.1
[58] Field of Search .................... 346/160, 107 R, 108, 346/154, 153.1; 358/300, 302

[56] References Cited

U.S. PATENT DOCUMENTS 4,710,779 12/1987 Funaki et al. .................. 346/160
4,761,662 8/1988 Yoshimoto et al. ............. 346/160

OTHER PUBLICATIONS

JP-A-59-69765, Patent Abstract by Kameyama.
JP-A-61-83557, Patent Abstract by Takeda.
JP-A-63-78163, Patent Abstract by Azuma.
JP-A-63-78164, Patent Abstract by Azuma.

Primary Examiner—Arthur G. Evans
Attorney, Agent, or Firm—Antonelli, Terry & Wands

[57] ABSTRACT

A high precision image recording apparatus includes an electrophotographic device having at least a photosensitive drum and an exposure unit, for forming a toner image on the surface of the photosensitive drum; a recording sheet feed/transport unit for feeding and transporting a recording sheet to which the toner image formed on the surface of the photosensitive drum is transferred; a transfer unit for transferring the toner image on the photosensitive drum to the recording sheet fed and transported by the recording sheet feed/transport unit; and a drive unit for driving the photosensitive drum and recording sheet feed/transport unit. The drive unit is provided with a motor coupled to the photosensitive drum via a rotation transmission mechanism having a speed reduction ratio of 1/integer number (inclusive of 1/1), and the exposure unit is provided with a recording start position control unit for starting recording image information from a predetermined reference position on the photosensitive drum.

30 Claims, 14 Drawing Sheets

HIGH PRECISION IMAGE RECORDING APPARATUS

BACKGROUND OF THE INVENTION

The present invention relates to an image recording apparatus, and more particularly to a high precision image recording apparatus suitable for repetitively recording a same image on a plurality of recording sheets with high precision.

In a conventional recording apparatus of this type, for example, as disclosed in Japanese Laid-open Patent Publication No. JP-A-59-69765, the surface of a photosensitive drum driven via a gear train, timing belt or chain at a constant speed with a motor rotating at high speed is uniformly charged with a copying exposure apparatus, laser exposure apparatus or LED exposure apparatus to thereby form a latent image thereon. The latent image is transformed into a toner image with a developing unit and transferred on a recording sheet to obtain a copy or printed matter.

In one of conventional recording apparatus, the circumferential length of a transfer drum which supports and endlessly moves a transfer sheet is set at an integer-fold length of that of the photosensitive drum (JP-A-61-83557).

In another of conventional recording apparatus, the rotating speed of the photosensitive drum is changed during the time while a new recording sheet is fed to a print position so that writing a image always starts at a fixed position on the photosensitive drum to thereby minimize magnification/reduction of an image print sample (JP-A-63-78163).

Further in another of conventional recording apparatus, the paper feed timing is regulated so that writing an image always starts at a fixed position on the photosensitive drum to thereby minimize magnification/reduction of an image print sample (JP-A-63-78164).

The above-described three Japanese Patent Laid-open Publications (JP-A-61-83557, JP-A-63-78163, and JP-A-63-78164) do not refer to eccentricity of the drive unit (gear, timing belt or the like) for the photosensitive drum. If the rotational speed of the photosensitive drum varies independently during each revolution cycle thereof and if the write start positions only are merely set in positional alignment, it is not possible to minimize magnification/reduction of an image print sample. Particularly in the last two Japanese Patent Laid-open Publications (JP-A-63-78163 and JP-A-63-78164), if the paper feed roller is eccentric relative to its axis, the paper feed speed at the transfer position varies and results in a certain magnification/reduction of an image print sample.

As mentioned above, in the conventional apparatus, the rotation fluctuation of a photosensitive member and the recording sheet feed speed fluctuation have not been sufficiently considered. There arises therefore the problem that the pitch fluctuation of an image in the sub-scan direction (recording sheet feed direction) becomes large. The reasons for this will be described in the following:

First, the driving source or motor rotating at high speed causes the photosensitive member to rotate at a reduced speed by means of a multiple gear train. Therefore, the rotation fluctuation of the photosensitive member depends upon the accuracy of gear shape, gear circularity, errors of distance between gear shafts, gear meshing errors, and the like.

Second, an electrophotographic processing unit including a cleaning unit and developing unit in contact with the surface of the photosensitive member exerts a load to the latter. The cleaning unit in particular changes its contact state with the photosensitive member in accordance with the amount of toner. Such load change is one of the reasons of the rotation fluctuation of the photosensitive member.

Third, rollers for transporting a recording sheet are driven via a gear train, timing belt, chain or the like by a drive system for the photosensitive member. In addition, a clutch and the like are used for controlling the recording sheet feed timing. These load changes are applied to the photosensitive member via the drive system to thereby cause the rotation fluctuation of the photosensitive member.

If the rotation fluctuation of the photosensitive member is present because of these reasons, there occurs a fluctuation in print pitch between images exposed with an optical device, the print pitch fluctuation being in correspondence with the rotation fluctuation of the photosensitive member.

In addition, there is no consideration of precision regarding the gear train, timing belt, chain or the like for driving the recording sheet transport rollers. Even if such consideration is made, there is a precision limit in practical manufacture, thereby generating a fluctuation of recording sheet transport speed. This transport speed fluctuation results in a transfer fluctuation and print pitch fluctuation.

The print pitch fluctuation results from the above reasons. The print pitch fluctuation varies for each of recording sheets so that if a same image is printed on a plurality of recording sheets, there is a shift in position between printed images.

It is an object of the present invention to reduce the print pitch fluctuation, make the reduced print pitch fluctuation to occur at same positions on each recording sheet to thereby avoid the generation of positional shift between printed images.

SUMMARY OF THE INVENTION

To achieve the above object of this invention, there is provided a high precision image recording apparatus comprising electrophotographic means having a cylindrical photosensitive drum rotatively supported, charger, exposure means, developing unit, cleaner and eraser, for forming a toner image on the surface of said photosensitive drum; a recording sheet feed/transport unit for feeding a recording sheet to which said toner image formed on the surface of said photosensitive drum is transferred; transfer means for transferring said toner image on said photosensitive drum to said recording sheet fed by said recording sheet feed/transport unit; and a drive unit for driving said photosensitive drum and recording sheet feed/transport unit; wherein said drive unit is provided with a motor coupled to said photosensitive drum via a rotation transmission mechanism having a speed reduction ratio of 1/integer number (inclusive of 1/1); and said exposure means is provided with recording start position control means for starting recording image information from a predetermined fixed reference position on said photosensitive drum.

The recording sheet feed/transport unit is discretely constructed of a paper feed unit for extracting a recording sheet from a plurality of recording sheets and supplying the extracted sheet in position alignment with the toner image on the photosensitive drum, and a paper transport unit for transporting the supplied recording sheet, wherein the paper transport unit is driven with said motor provided for said photosensitive drum.

The recording start position control means provided for said exposure means is discretely constructed of first recording start position control means for starting recording image information from a predetermined fixed reference position on said photosensitive drum and second recording start position control means for starting recording image from an arbitrary position on said photosensitive drum, wherein there is provided mode switching means for selectively actuating one of said first and second recording start position control means.

The speed reduction ratio of the rotation transmission mechanism provided for said drive unit for coupling said photosensitive drum and motor is 1:n where the relationship between n and an integer m closest to n satisfies the following formula:

$$|n-m| \leq 0.125$$

The recording start position control means is constructed of rotation-response type pulse generating means coupled to said photosensitive drum and to said rotation transmission mechanism including said motor, and counter means for counting a pulse signal outputted from said pulse generating means.

The drive unit comprises said motor coupled to said photosensitive drum by said rotation transmission mechanism having a speed reduction ratio of 1/integer number (inclusive of 1/1), an encoder responsive to the rotation of said motor, and speed control means for controlling to rotate said motor at a constant speed while referring to said pulse signal outputted from said encoder. The exposure mean is provided with said recording start position control means for starting recording image information from a predetermined fixed reference position on said photosensitive drum. Said recording start position control means is constructed of said count means for counting a pulse signal outputted from said encoder.

The exposure means is provided with said recording start position control means for starting recording image information from a predetermined fixed reference position on said photosensitive drum. Said recording start position control means is constructed such that the recording start timing for a first page of image information on said photosensitive drum is set at said reference position, and the recording start timing for a second page of image information is controlled by count means which uses as a count reference said record start timing for said first page.

The exposure means is provided with said recording start position control means which generates a synchro signal requesting an image information signal generator to generate an image information signal at said predetermined fixed reference position on said photosensitive drum.

The exposure means is provided with said recording start position control means which generates a synchro signal requesting via communication means an external image information signal generator to generate an image information signal at said predetermined fixed reference position on said photosensitive drum.

Since the photosensitive member or drum is made of high precision, the drum itself does not generate print pitch fluctuation. The drive unit for driving the photosensitive drum is provided with a motor which is separately mounted from recording sheet extracting means and position alignment means having a large load variation. Therefore, the motor has less rotation fluctuation caused by load variation to thereby reduce print pitch fluctuation. In addition, the rotation transmission mechanism coupling the photosensitive drum to the motor has a speed reduction ratio of 1/integer number, and the recording start position of image information is controlled to be set at a predetermined fixed position. Consequently, the print pitch fluctuation not removed always occurs at same print positions of each recording sheet so that even if a same image is printed on a plurality of recording sheets or even if a plurality of images are repetitively printed on a single recording sheet, a shift in position of image can be reduced.

Speed reduction using a single pair of gears between the photosensitive drum and motor will be clarified mathematically. Assuming that the rotation cycle of the photosensitive drum D is Td[sec/rev.], the rotation cycle of the motor is Tm, and the speed fluctuations of these components are $\Delta Vd$ and $\Delta Vm$, respectively, the circumferential speed V[mm/sec] of the photosensitive drum is expressed by:

$$V = V_0 + Vd \cdot \sin \frac{2\pi}{Td} t + \Delta Vm \cdot \sin \frac{2\pi}{Tm} t$$

and the rotation cycle of the photosensitive drum is expressed by:

$$Td = (k + d) Tm$$

$$k: \text{integer}, -0.5 < d \leq 0.5$$

Assuming that the print start time is ts, the distance L from the print start position to the line laterally scanned after t seconds is expressed by:

$$L = \int_{ts_1}^{ts_1+t} V dt$$

$$= V_0 t - \frac{Td}{2\pi} \Delta Vd \left\{ \cos \frac{2\pi}{Td}(ts+t) - \cos \frac{2\pi}{Td} ts \right\} -$$

$$\frac{Tm}{2\pi} \Delta Vm \left\{ \cos \frac{2\pi}{Tm}(ts+t) - \cos \frac{2\pi}{Tm} ts \right\}$$

$$= V_0 t - \frac{Td}{2\pi} \Delta Vd \sqrt{2\left(1 - \cos \frac{2\pi}{Td} ts\right)} \cos\left(\frac{2\pi}{Td} t + \phi d\right) -$$

$$\frac{Tm}{2\pi} \Delta Vm \sqrt{2\left(1 - \cos \frac{2\pi}{Tm} ts\right)} \cos\left(\frac{2\pi}{Tm} t + \phi m\right)$$

Assuming that the print start time for a first page is $ts_1$, the print start time $ts_2$ for the second page which is printed after a lapse of the rotation cycle of the photosensitive drum multiplied by (m+e), is expressed by:

$$ts_2 = ts_1 + (m+e) Td$$

$m$: integer, $-0.5 < e \leq 0.5$

In the above equation, the term associated with the print start time is given by:

$$\cos \frac{2\pi}{Td} ts_2 = \cos\left[\frac{2\pi}{Td}\{ts_1 + (m+e)Td\}\right]$$

$$= \cos\left\{\frac{2\pi}{Tm} ts_1 + (m+e)(k+d)2\pi\right\}$$

$$= \cos\left\{\frac{2\pi}{Tm} ts_1 + 2\pi(k \cdot e + m \cdot d + d \cdot e)\right\}$$

It can be seen therefore that if d=0 and e=0, the distance L becomes the same for the first and second pages.

The range of values d and e which poses no problem in practical use will be specifically described. It is assumed that the gear ratio is an integer, the write start position is moved by 45 degrees, and the following values are used:

Td=2.52, Tm=0.84 k=3, d=0

ΔTd=0.2 mm/sec.

ΔTm=0.2 mm/sec.

m=2, e=0.125 (corresponding to 45°)

then, the maximum value of L1-L2 becomes 0.22 mm.

If it is assumed that the write start position is fixed, the gear ratio takes a value other than an integer, and the following values are used;

Td=2.52, Tm=0.877 k=3, d=−0.125

ΔTd=0.2 mm/sec.

ΔTm=0.2 mm/sec.

m=2, e=0 then, the maximum value of L1-L2 becomes 0.08 mm. Both the levels present no practical problem.

As described above, by starting printing an image from substantially the same position on the photosensitive drum, the print pitch fluctuation always occurs at same positions on each recording sheet. Accordingly, a same image can be printed on a plurality of recording sheets while retaining the same print pitch fluctuation for all recording sheets.

Further, since the diameter of the paper transport roller is 1/n of that of the photosensitive drum, the effect of vibration of the paper transport roller appears at the corresponding position on the photosensitive drum.

A selection signal from a host determines if the print operation starts from the fixed position on the photosensitive drum or from an arbitrary position. In the latter case, the next page can be printed before the fixed position on the photosensitive drum comes so that the print speed can be raised although the pitch fluctuation is not fixed for each recording sheet.

If image information signals to be recorded are supplied in the form of video signals from an external image information signal generator, it is not necessary to provide a large buffer memory in the recording apparatus.

DESCRIPTION OF THE PREFERRED EMBODIMENTS

Figure 1:
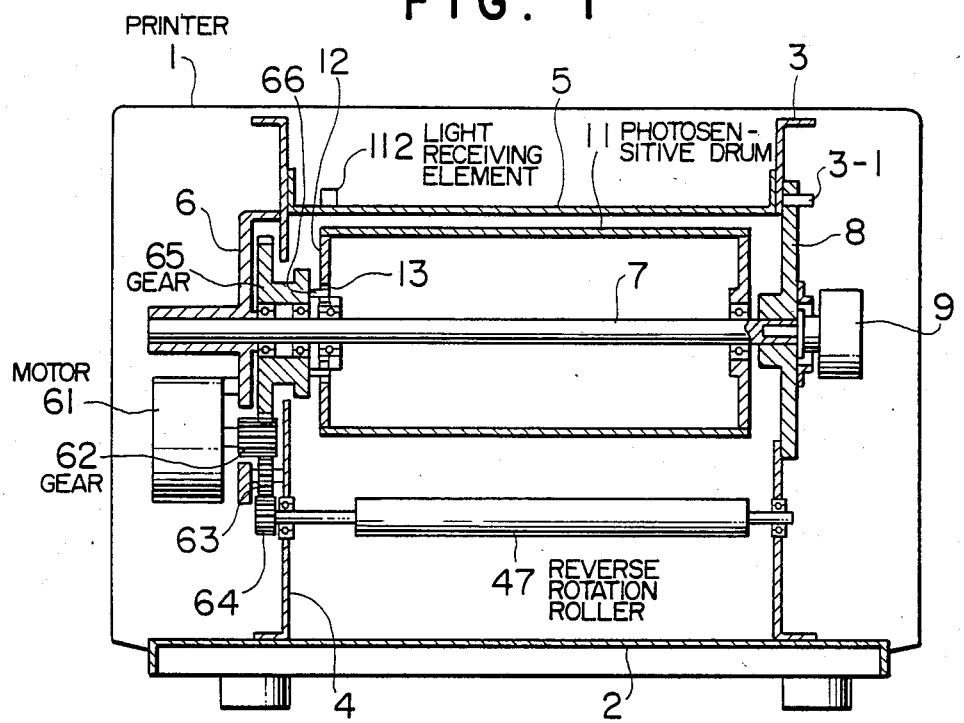
FIG. 1 is a schematic illustration of a photosensitive drum drive apparatus used with a first embodiment of a high precision image recording apparatus of this invention.

The embodiments of the present invention will be described in detail with reference to the accompanying drawings.

There is provided a base 2 at the bottom of a printer main body 1. Front and back side plates 3 and 4 are mounted on the base 2. Between the front and back side plates 3 and 4, there is mounted a stay 5. Mounted on the front side plate 3 is a position alignment pin 3-1 which is used for the position alignment of a support plate 8. Mounted on the back side plate 4 is a gear base 6 on which a motor 61 is mounted for driving a photosensitive drum 11. A gear 61 is fixedly mounted on the shaft of the motor 61. A gear 65 is rotatively mounted on the shaft 7 and meshed with the gear 62. A gear 64 is fixedly mounted on a reverse rotation roller 47 and is meshed via an idler gear 63 with the gear 62. The diameter of the photosensitive drum 11 and reverse rotation roller 47 and the number of teeth of the gears are set as in the following Table.

|  | Diameter | Gear Name | No. of Teeth |
|---|---|---|---|
| Photosensitive Drum 11 | 120 mm | Gear 65 | 168 |
| Motor 61 |  | Gear 62 | 42 |
|  |  | Idler Gear 63 | 42 |
| Reverse Rotation roller 47 | 20 mm | Gear 64 | 28 |

A pin 66 is mounted on the gear 65 to drive the photosensitive drum 11. On opposite end sides of the photosensitive drum 11, there are provided end brackets 12 each having a driving aperture 13. When the photosensitive drum 11 is mounted on the printer main body 1, the pin 66 engages with the aperture 13 A knob 9 is rotatively mounted on the support plate 8, the knob being formed with external threads at the distal end portion. Internal threads are formed at the corresponding position of the shaft 7. After the photosensitive drum 11 is mounted, the support plate 8 is held in position with the aid of the position alignment pin 3-1. The support plate 8 can be fixedly mounted on the front side plate 3 by screwing the knob 9 into the shaft 7.

The circumferential end portion of 10 mm width of the photosensitive drum 11 is colored black, a reflector area 15 being formed at a certain position of the end portion. A light emitting diode (LED) 111 and light receiving element 112 are mounted on the stay 5 at the positions corresponding to the photosensitive drum 11 end portion. Only when the reflector portion 15 passes under the LED 111 during the rotation of the photosensitive drum, a light beam from the LED 111 reaches the light receiving element 112.

Figure 3:
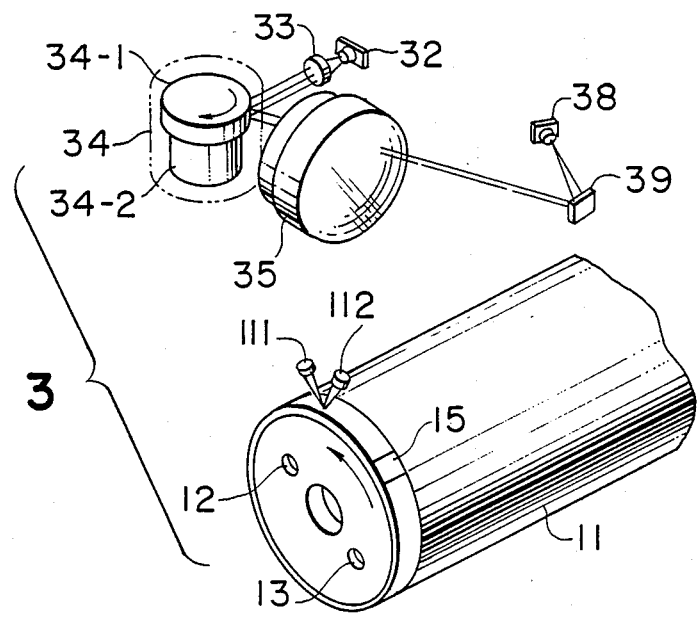
FIG. 3 is a perspective view showing the photosensitive drum and its peripheral devices used in the first embodiment.
Figure 2:
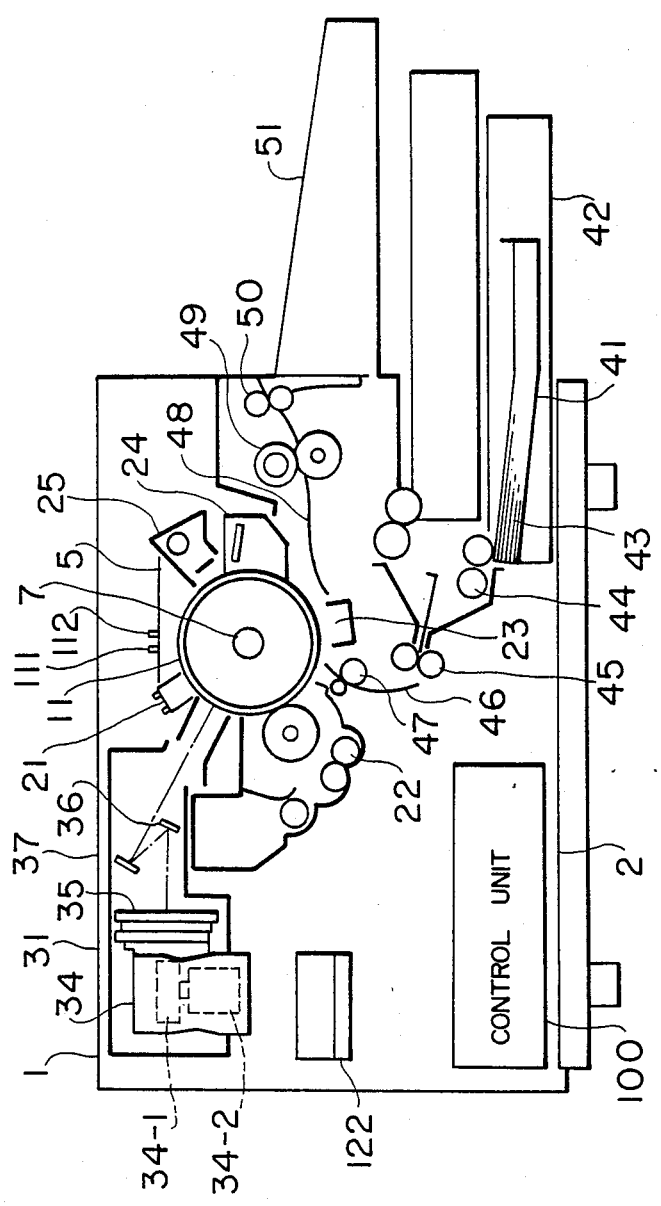
FIG. 2 is a lateral cross section of a printer used in the first embodiment.
Figure 4:
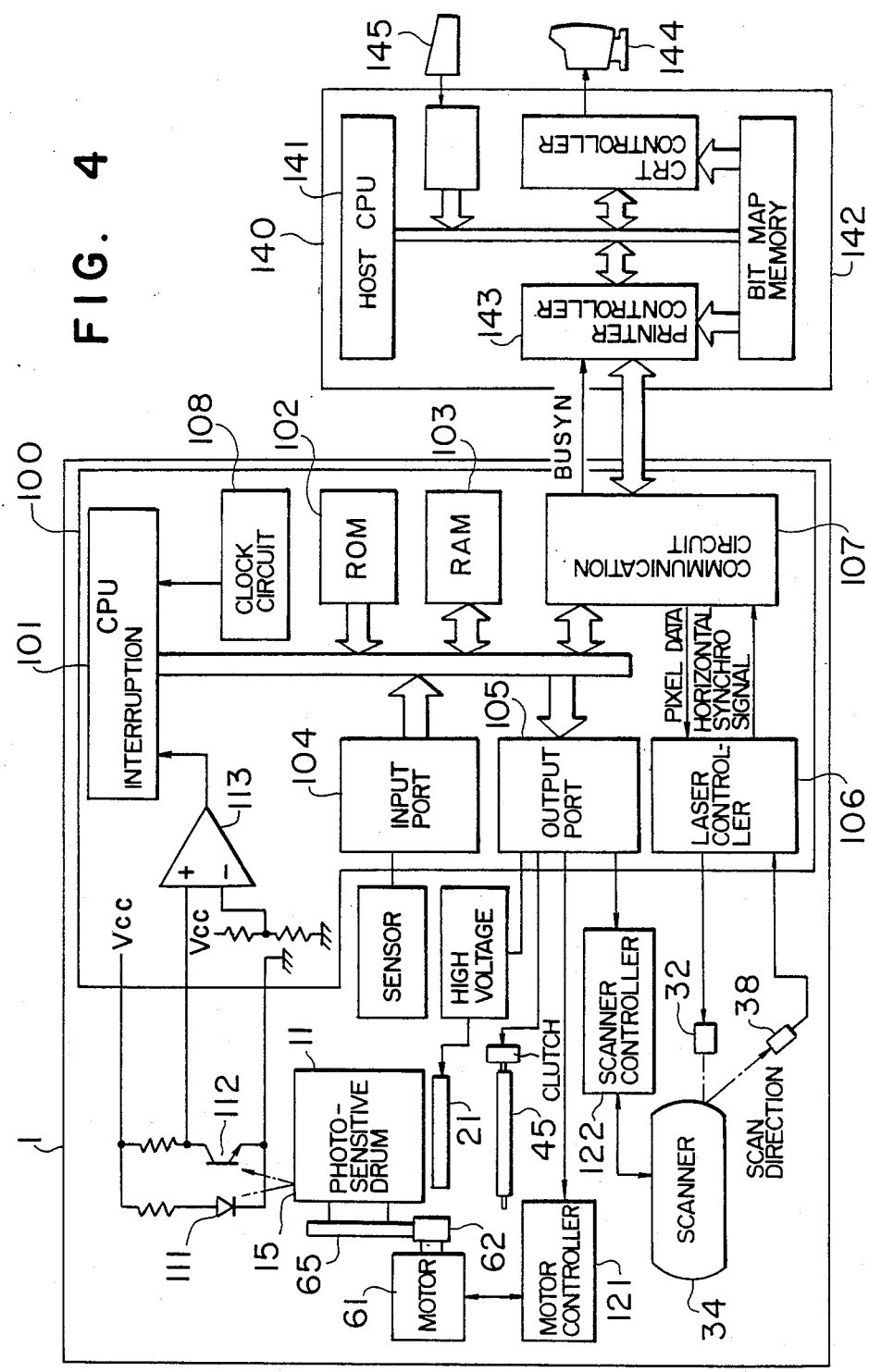
FIG. 4 is a block diagram showing the control circuit used in the first embodiment.

Referring to the lateral cross section of the printer main body 1 shown in FIG. 2, the photosensitive drum 11 is located at the middle of the printer main body 1. At the periphery of the photosensitive drum 11, there are provided a charger 21, developing unit 22, transfer unit 23, cleaner 24, and erase lamp 25. A laser beam exposure device 31 is mounted on the printer main body 1 at the upper portion thereof. Within the laser beam exposure device 31, there are provided a scanner 34 constructed of a semiconductor laser 32, coupling lens 33, polygon mirror 34-1, and motor 34-2 for rotating the polygon mirror; F-$\theta$ lens 35; and reflector mirrors 36 and 37. As best shown in FIG. 3, a beam detector 38 and mirror 39 are provided for the detection of a position of a deflected and scanned laser beam. Provided at the lower right side of the printer main body 1 are a paper cassette 42 for accommodating recording paper sheets 41, extraction roller 43 for extracting a recording sheet 41, separator roller 44 for feeding only one sheet when a plurality of recording paper sheets were extracted, registration roller 45 for controlling a write head position (paper feed timing) on the recording sheet 41, and reverse rotation guide and roller 46 and 47 for guiding the recording sheet 41 to the photosensitive drum 11. Provided at the upper right side of the printer main body 1 are a guide plate 48, mixing unit 49, and paper discharge roller 50. A discharge paper tray 51 is provided outside of the printer main body 1 to receive printed recording paper sheets 41. Although not shown, there are also provided a motor for driving the developing unit, a motor for driving the fixing unit and extraction roller, and other necessary components.

A control unit 100 is provided at the lower left side of the printer main body 1. The control unit 100 is provided with a CPU 101, ROM 102, RAM 103, input port 104 for various sensors, output port 105 for the on/off control of the motor 61 and the like, laser controller 106, communication circuit 107 for communication with a host 140, and clock circuit 108 for generating signals used as the operation reference of CPU 101. ROM 102 stores therein a set of programs controlling the operation of the printer. These printer control programs are classified into those for an ordinary mode and for a high precision mode. There are provided, in addition to the control unit 100, other dedicated control circuits such as a motor controller 121 for controlling the number of revolutions of the motor 61 by means of a PLL control scheme using a crystal oscillator, scanner controller 122 for controlling the number of revolutions of the scanner 34, control circuit (not shown) for maintaining the temperature of the fixing unit 49 at a constant value. An output from the light receiving element 112 is converted to a TTL level by a comparator 113 and inputted as an interruption signal to CPU 101. The host 140 is provided with a host CPU 141, bit map memory 142 in which print image information is stored in the form of video data, printer controller 143 for controlling the printer, CRT 144, keyboard 145 and the like.

The operation of the image recording apparatus constructed as above will be described with reference to FIGS. 5 and 6. A print command from the host 140 includes a switch signal between the ordinary mode and high precision mode. The ordinary and high precision modes have different write timings, but the other operations are the same for both the modes. Therefore, in the following the high precision mode will be described in detail.

Upon powering on the printer 1, only the fixing unit 48 is controlled to have a constant temperature, and the other parts of the printer 1 are held in a suspended state to wait for a print command from the host 140. When an operator instructs to start a print operation via the keyboard 145, the host CPU 141 develops document/graphics data into the bit map memory 142. After the data development, the host CPU 141 supplies a print command via the printer controller 143 to the printer 1. The print command includes, as described previously, a switch or discrimination signal between the ordinary and high precision modes.

Figure 5:
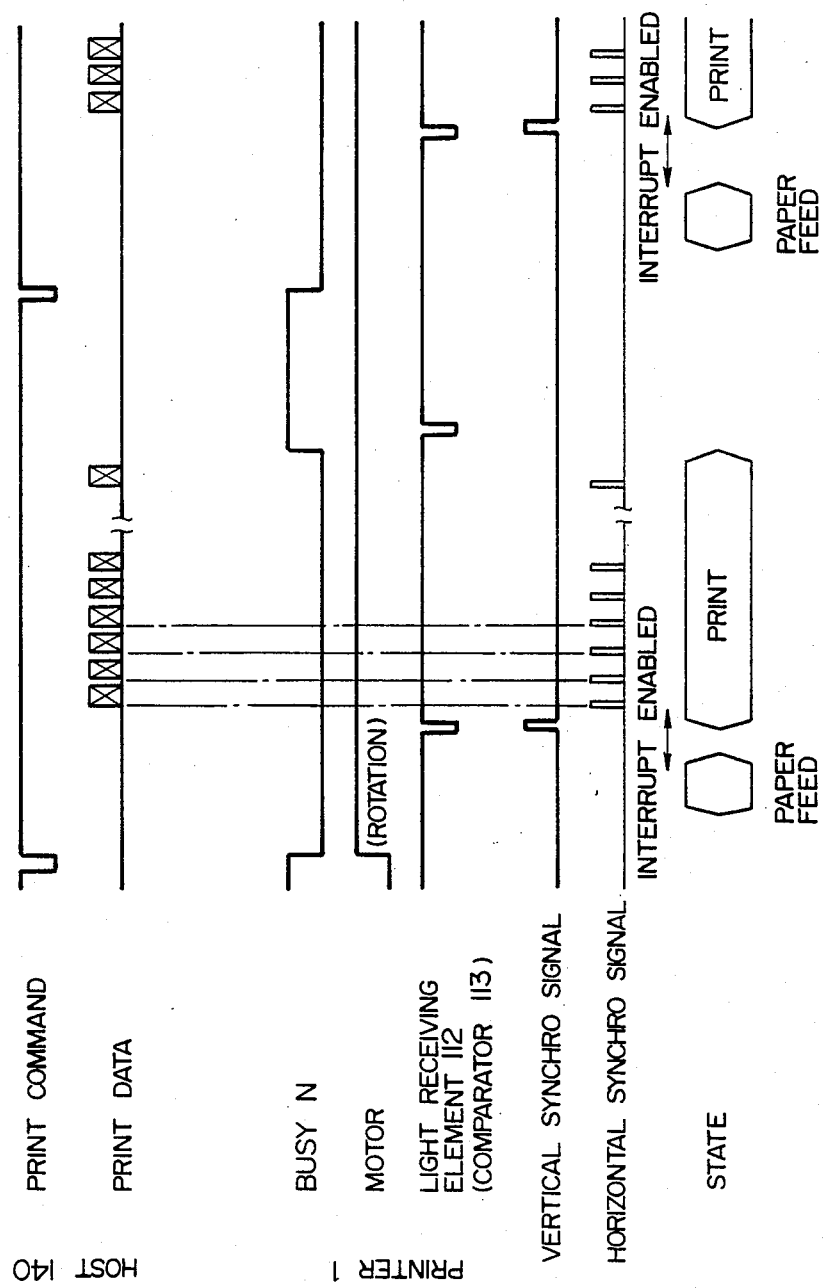
FIG. 5 is a timing chart illustrating the print control in the first embodiment.
Figure 6:
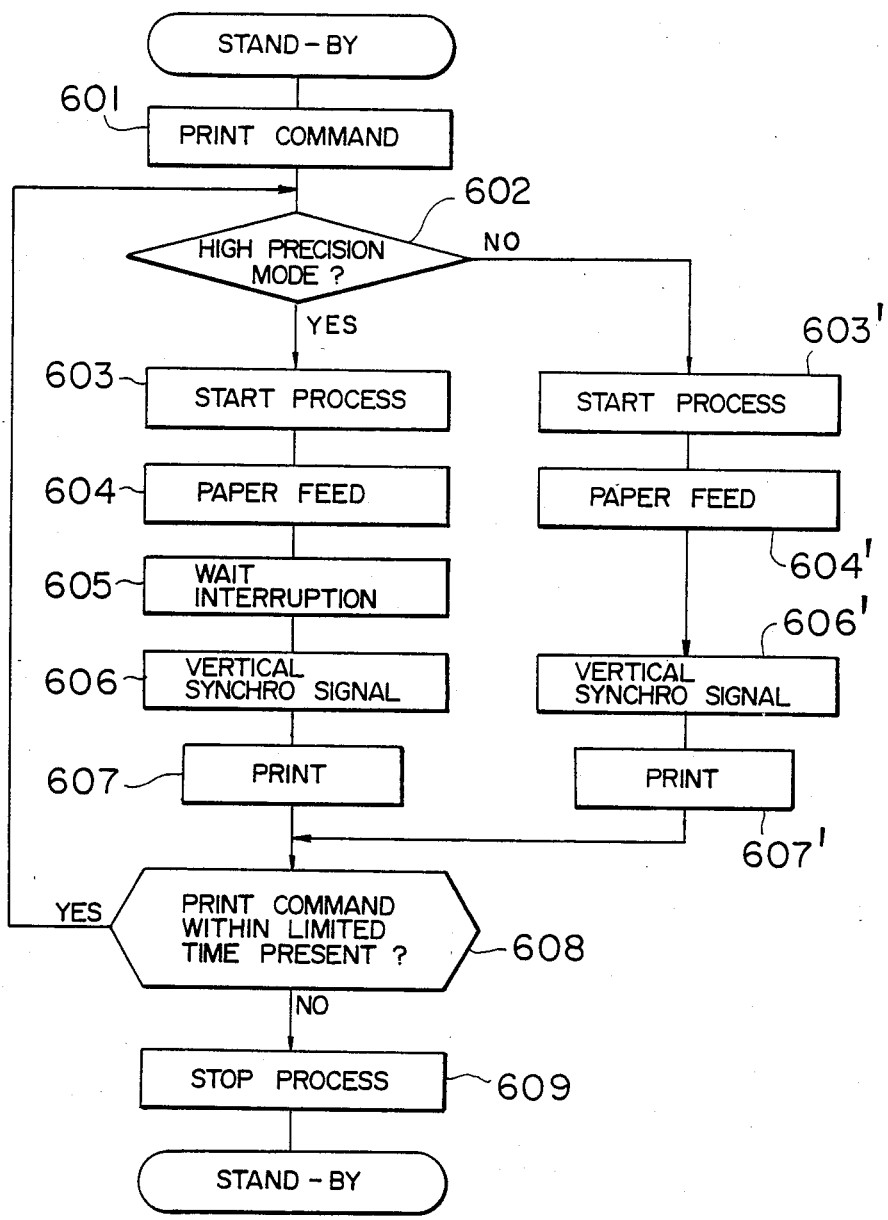
FIG. 6 is a flow chart illustrating the print control in the first embodiment.

Referring now to FIG. 5, upon receipt of the print command from the host 140 at process step 601, CPU 101 in the control unit 100 discriminates between the ordinary and high precision modes at process step 602. At process step 603, a signal Busy N from the communication circuit 107 to the host 140 is made a low level signal to indicate a print start. In parallel with the above operations, the motors and scanner 34 are caused to start rotating, the charger 21 and transfer unit 23 are applied with a high voltage, and the erase lamp 25 is turned on. When the motors start rotating, the photosensitive drum 11, developing unit 22 and fixing unit 49 also start rotating. Upon application of a high voltage to the charger 21, the photosensitive drum 11 is uniformly charged At process step 604, a sheet of recording paper 41 is extracted via the extraction roller 43 from the paper cassette 42, and sent to the registration roller 45 at which the paper sheet is stopped. After a certain time lapse, CPU 101 waits for an interruption signal from the light receiving element 112 at process step 605. When the reflector portion 15 comes under the LED 111 during rotation of the photosensitive drum 11, the light receiving element 112 receives a light beam from the LED 111 so that an output of the element 112 changes to make the output of the comparator 113 a low level signal which in turn interrupts CPU 101. Upon this interruption, at process step 606 CPU 101 supplies a vertical synchro signal via the communication circuit 107, and inhibits an interruption from the light receiving element 112. The control then advances to a printing process step 607.

During the printing process, the host 140 which received the vertical synchro signal supplies print data to the printer 1 by using signals from the beam detector 38 as the horizontal synchro signals. The print data are supplied to the laser controller 106 to control the on/off operation of the semiconductor laser 32. The laser beam outputted from the semiconductor laser diode 32 is made parallel by the coupling lens 33, deflected and scanned by the scanner 34, and focussed on the photosensitive drum 11 via the F-$\theta$ lens 35, and reflector mirrors 36 and 37 to thereafter apply light to the photosensitive drum 11 and form an electrostatic latent image thereon The latent image on the photosensitive drum 11 is deposited with micro powders (toner) by means of the developing unit 22 to develop the latent image. In the meantime, the registration roller 45 starts rotating after a certain time lapse from the print start, to thereby start feeding the recording sheet 41 having been stopped in front of the registration roller 45. The recording sheet 41 is directed in the reverse direction by means of the reverse rotation guide and roller 46 and 47 and delivered to the transfer unit 23. The toner image on the photosensitive drum 11 is transferred on the recording paper sheet 41 upon operation of the transfer unit 23. The micro powders left on the photosensitive drum 11 without having been transferred are removed with the cleaner 24, whereas electric charge left on the photosensitive drum 11 is eliminated with the erase lamp 25. Thereafter, the photosensitive drum 11 is again charged uniformly with the charger 21 to prepare for a next print.

The recording sheet 41 with the toner image transferred is transported into the fixing unit 49 via the guide plate 48. The fixing unit 49 melts the toner under heat, presses and fixes the toner on the recording sheet 41 which is thereafter discharged via the paper discharge roller 50 onto the discharge tray 51.

The Busy N signal changes to a high level signal after a lapse of a time period corresponding to a length of a recording sheet, to thereafter wait for the next page print command at process step 608. If a plurality of pages are to be printed, immediately after transmission of one page data the host 140 develops the next page data on the bit map memory 142. After this data development, the print command is issued from the host 140. If the print command is not issued until such time when the printed recording sheet 41 is discharged, CPU 101 moves its control to process step 609 whereat the motors are caused to stop, a high voltage applied to the charger 21 and transfer unit 23 is intercepted, and the erase lamp 25 is turned off.

In case where the print command indicates the ordinary mode, at process steps 603' and 604' the recording sheet 41 is extracted by means of the extraction roller 43 and fed to the registration roller 45. Thereafter, without waiting for an interruption from the light receiving element 112, the control moves to process step 606' whereat a vertical synchro signal is transmitted to the host 140 to start executing a print processing step 607'.

If the next page print command is received while the motors are stopped, the motors are caused to start rotating to repeat the above-described control operations.

Figure 7:
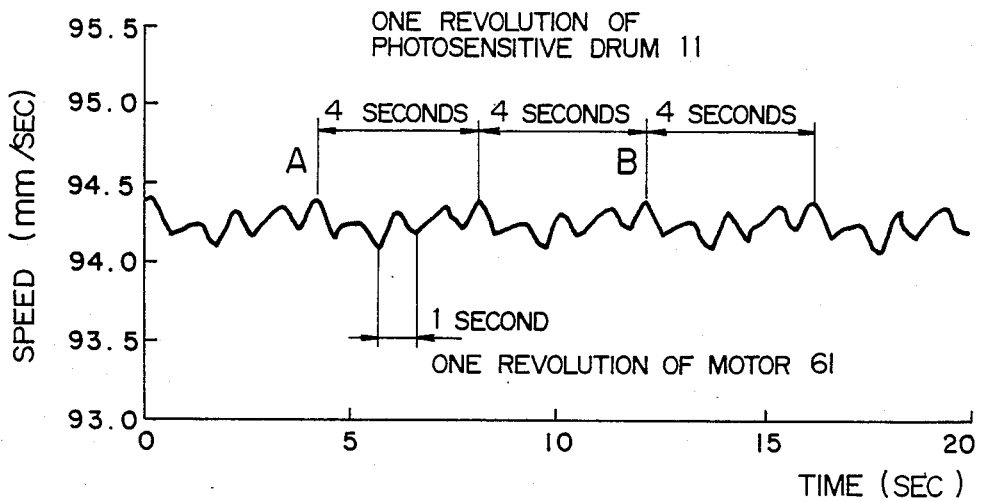
FIG. 7 is a graph showing the characteristic of the rotation speed fluctuation of the photosensitive drum used in the first embodiment.

An example of rotation speed fluctuation of the photosensitive drum 11 is shown in FIG. 7 wherein the ordinate represents time and the abscissa represents rotation speed. As seen from the graph, there are speed fluctuation of 4 second period corresponding to one revolution of the photosensitive drum 11 and speed fluctuation of 1 second period corresponding to one revolution of the motor 61. Although not clearly seen from the graph of FIG. 7, there is also speed fluctuation of 0.67 second period corresponding to one rotation of the reverse rotation roller 45. It can be seen that the total fluctuation repeats at the period of 4 seconds. It is to be noted that speed fluctuation of short period which may adversely effect the half-tone property and the like is not present because the motor 61 rotates at a constant speed. Consider now that printing a first sheet starts at time A shown in FIG. 7 and a second sheet at time B. The speed fluctuation of the photosensitive drum during printing is the same for both the first and second sheets. The same speed fluctuation means that displacement of print pitches is the same for both the sheets.

Figure 8A:
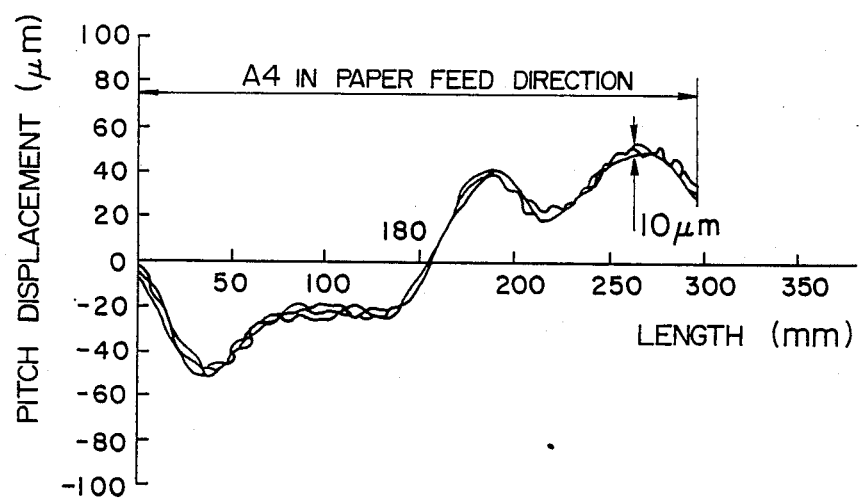
FIGS. 8(a) and 8(b) are graphs showing the fluctuation of print pitch when write start positions are maintained constant and not constant, respectively, in the recording apparatus of the first embodiment.
Figure 8B:
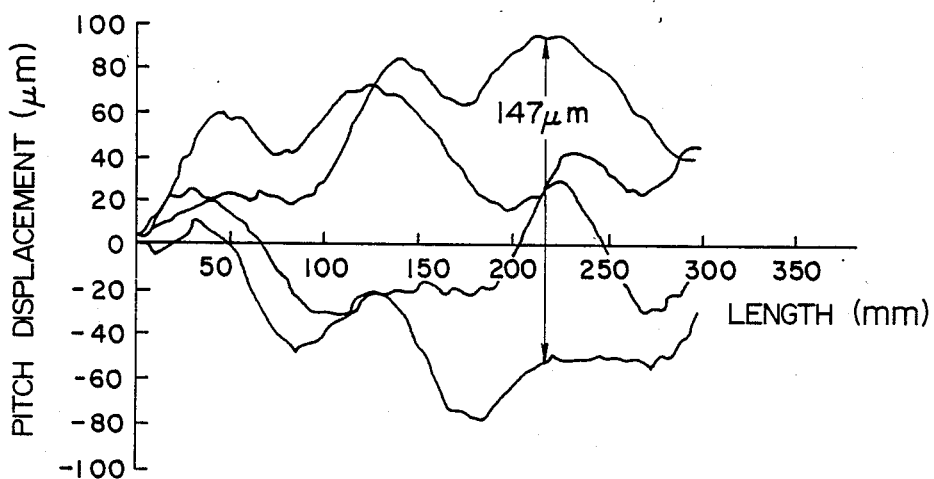

Shown in FIG. 8 is an example of a measured result of print pitch displacement between four recording sheets 41 respectively printed in the ordinary and high precision modes. The ordinate represents a theoretical length obtained from a dot density, and the abscissa represents a displacement from the theoretical length. In the high precision mode, the print pitches fluctuate in the same manner for all recording sheets as shown in FIG. 8(b) because the write start positions on the photosensitive drum are the same. The deviation value for four recording sheets is therefore restricted within about 10 microns. In the ordinary mode on the other hand, the print pitch has a different phase for each recording sheet as shown in FIG. 8(b) because the write start positions are different for each recording sheet. The deviation value for four recording sheets becomes as large as about 147 microns so that the print pitches are not superposed one upon another.

According to this embodiment, print fluctuation of short period which deteriorates half-tone property is not present so that a high quality print can be obtained. In the high precision mode, the same image information can be printed on a plurality of pages without print fluctuation. In the ordinary mode, since the write start positions are not necessary to be aligned in position, a print can be obtained at higher speed than the high precision mode.

Figure 9:
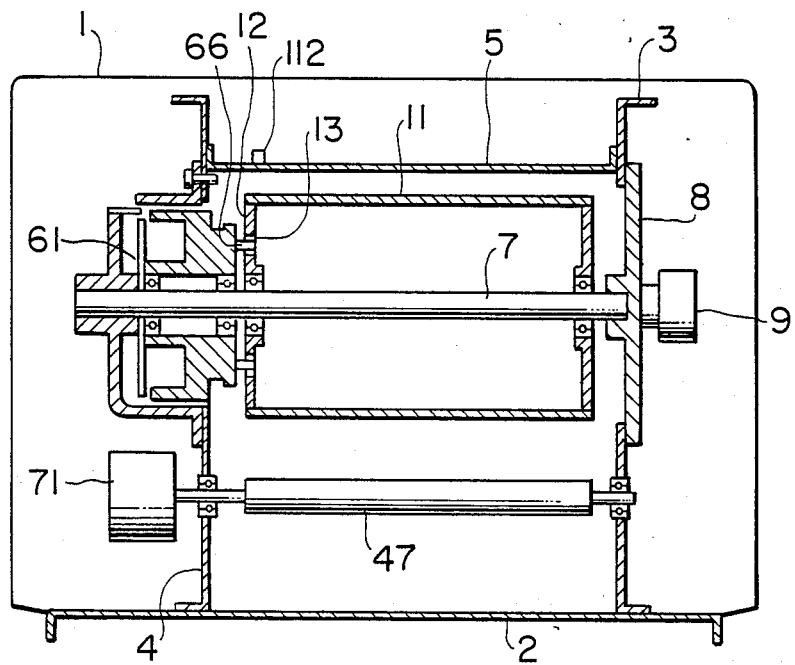
FIG. 9 is a schematic illustration of the photosensitive drum drive apparatus used with a second embodiment of the present invention apparatus.

The second embodiment of the present invention is shown in FIG. 9. In this embodiment, a motor 61 directly drives the photosensitive drum 11, and another motor 71 directly drives the reverse rotation roller 47. The structure of the other components is the same as the first embodiment. Such a direct drive method of this embodiment eliminates the influence caused by the gears and allows to select an optimum motor matching its own load.

Figure 10:
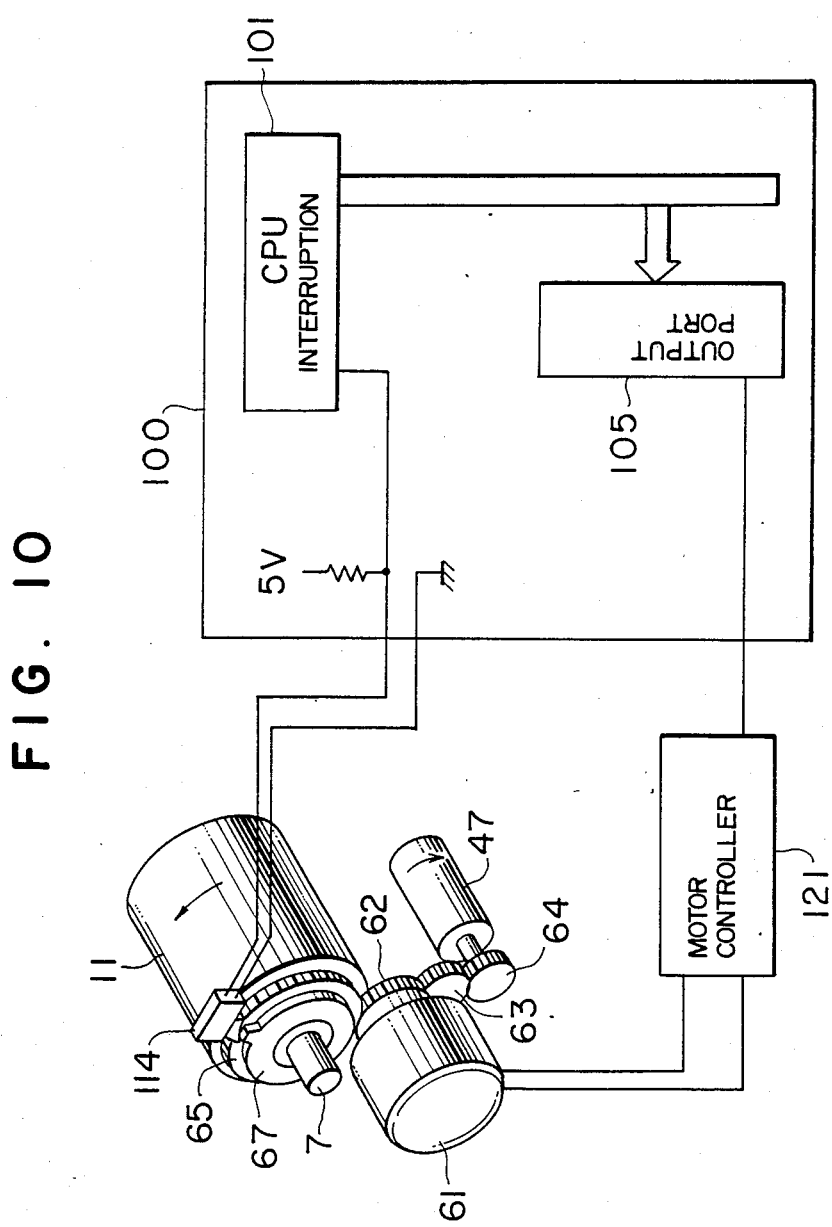
FIG. 10 shows the peripheral devices used with the photosensitive drum of a third embodiment of the present invention apparatus in perspective view and its control circuit in block diagram.

The third embodiment of this invention is shown in FIG. 10. In this embodiment, instead of the reflector portion 15 of the photosensitive drum 11, LED 111, light receiving element 112, and comparator 113 of the control unit 100, respectively of the first embodiment, a cam 67 is formed on the gear 65, and a detection switch 114 is mounted at the position corresponding to the cam 67. One terminal of the detection switch 114 is supplied with 5 V via a resistor 115, and the other terminal is grounded. The structure of the other components is the same as the first embodiment.

The cam 67 rotating with the photosensitive drum 11 turns on the switch 114 once per revolution. In the high precision mode, when the detection switch 114 turns on while CPU 101 waits for an interruption, CPU 101 supplies a vertical synchro signal via the communication circuit 107 to start printing.

According to this embodiment, the axial length of the photosensitive drum can be made short, and it is free from malfunction to be caused by stains on the reflector portion 15 and/or light receiving element 112.

Figure 11:
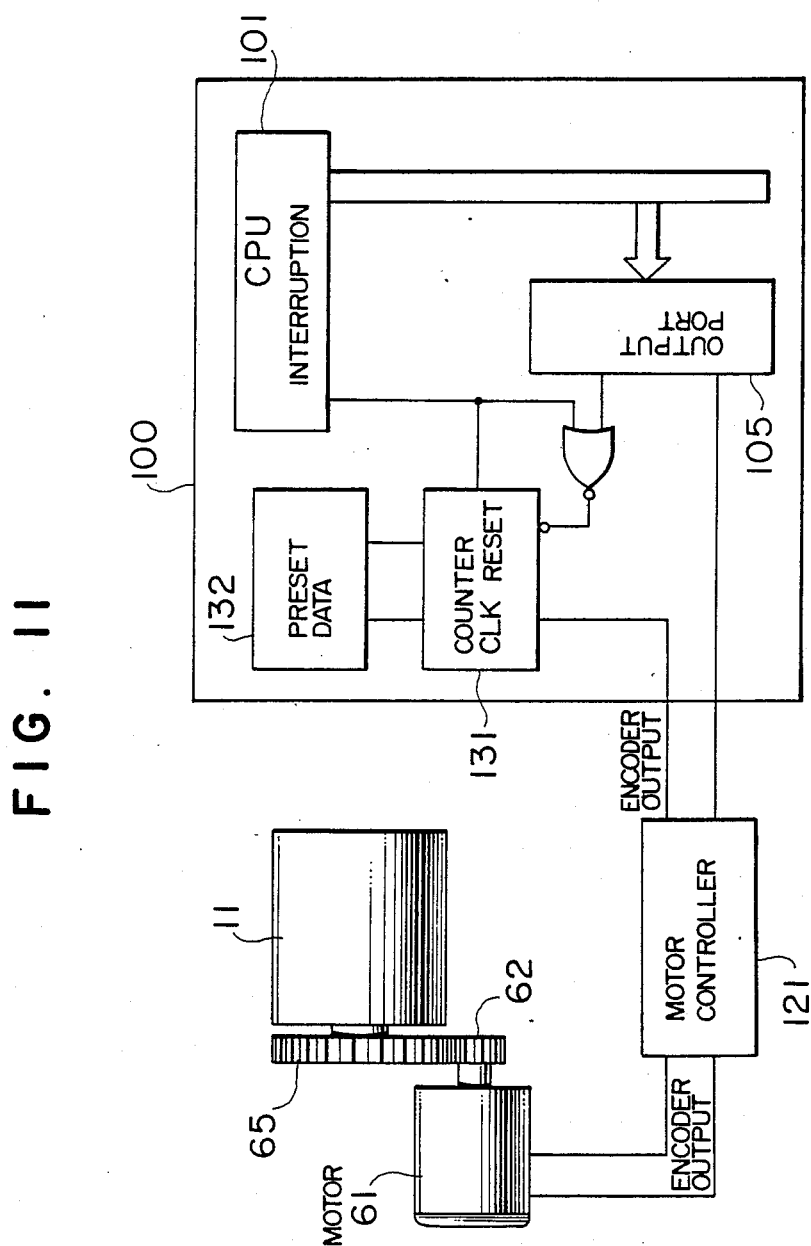
FIG. 11 shows the peripheral devices used with the photosensitive drum of a fourth embodiment of the present invention apparatus in schematic form and its control circuit in block diagram.

The fourth embodiment of this invention is shown in FIG. 11. In this embodiment, the reflector portion 15 of the photosensitive drum 11, LED 111, light receiving element 112 of the control unit 100, respectively of the first embodiment, are replaced with a subtraction counter 131 and data presetter 132, wherein an output from a speed control encoder for the motor 61 is supplied as a clock signal to the subtraction counter 131 via the motor controller 121. The encoder outputs pulses of 1440 ppr (pulses per revolution), the speed reduction ratio between the motor 61 and photosensitive drum 11 being 4:1. The value preset at the data presetter 132 is 5759 ($=4\times 1440-1$) corresponding to one revolution of the photosensitive drum 11. The subtraction counter 131 is set with the value of the data presetter 132 upon receipt of a reset signal. The value of the subtraction counter is reduced by one upon receipt of one pulse from the encoder. When the value of the subtraction counter 131 becomes zero, the output from the subtraction counter 131 is supplied as the interruption signal to CPU 101. The interruption signal is also used as the reset signal for the subtraction counter 131 which may be reset by means of CPU 101.

Figure 12:
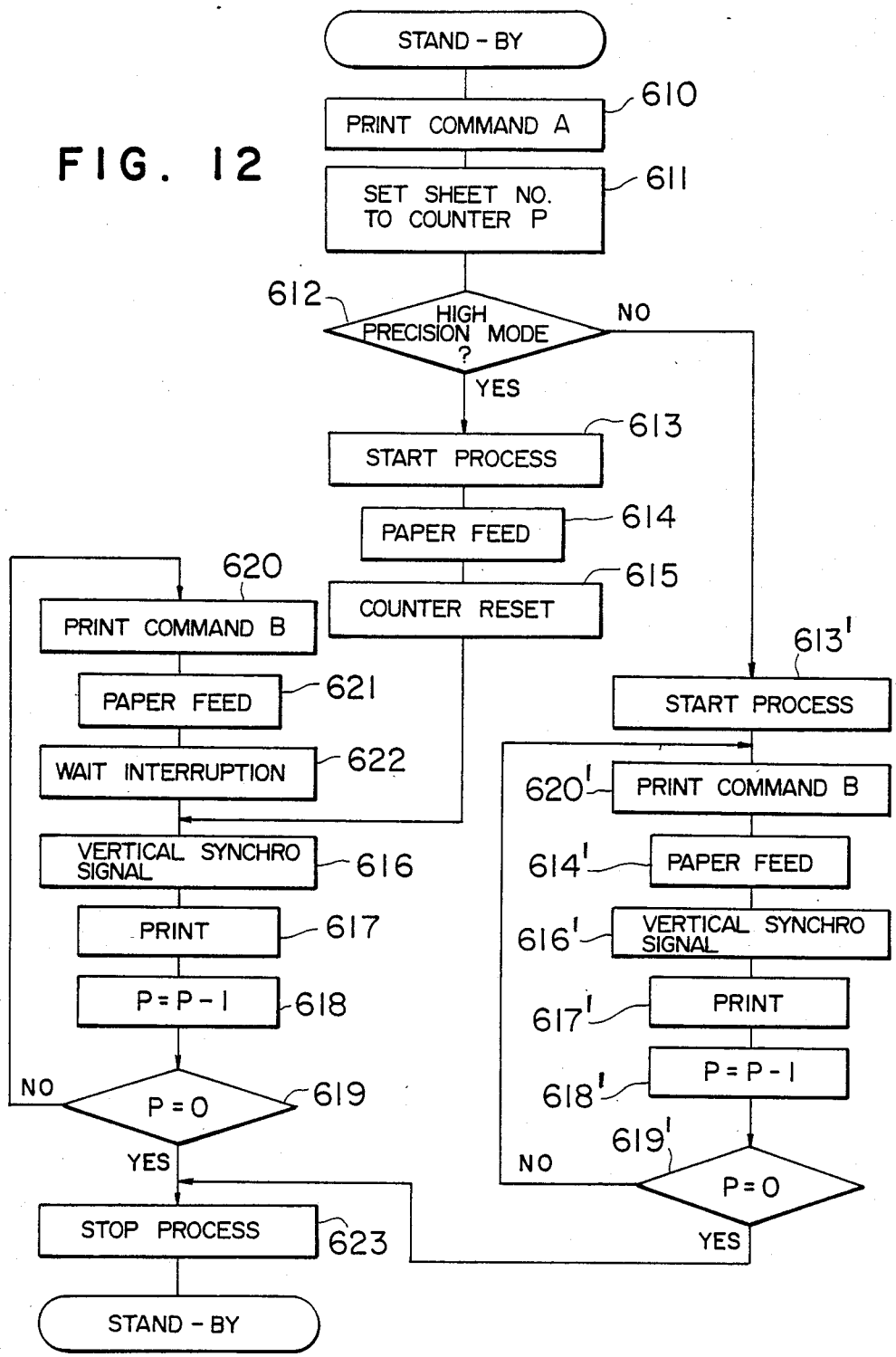
FIG. 12 is a flow chart illustrating the print control in the third embodiment.

A print command includes a print command A and print command B. The print command A includes the information on mode setting and the number of print sheets. The print command B indicates merely a print start. When the print command A is received at process step 610 shown in FIG. 12, the information on the number of print sheets is set in a counter P on RAM 103 at process step 611. It is checked at process step 612 if the selected mode is the high precision mode. In the case of the high precision mode, a start process is initiated at process step 613. When the first recording sheet 41 reaches the registration roller 45 at process step 613, CPU 101 resets the subtraction counter 131 (process step 615), supplies a vertical synchro signal via the communication circuit 107 (process step 616) to start printing (process step 617). After completion of printing, the control advances to process step 618 whereat the value of the counter P is decremented by 1. If the value of the counter P is not zero (process step 619), the print command B is waited at process step 620 without stopping the motor. Upon receipt of the print command B, the recording sheet 41 is fed to the registration roller at process step 621 to thereafter wait for an interruption signal from the subtraction counter 131 at process step 622. When the interruption signal is supplied from the subtraction counter 131, a vertical synchro signal is supplied via the communication circuit 107 at process step 616 to start the next print. The processes from process step 616 to process step 622 are repeated until the value of the counter P becomes zero. If the value of the counter P becomes zero, the control advances to process step 623 whereat a stop process is executed to stop the motor and terminate the printing operation.

In the ordinary mode, as shown by the processes from process step 613' to 620', the second and following recording sheets are printed in such a manner that when the print command B is received and the recording sheet 41 is fed, a vertical synchro signal is transmitted to the host 140 without waiting for an interruption signal from the subtraction counter 131.

According to this embodiment, since the first page can be printed at an arbitrary position of the photosensitive drum 11, it is advantageous in that a print time can be shortened.

Figure 13:
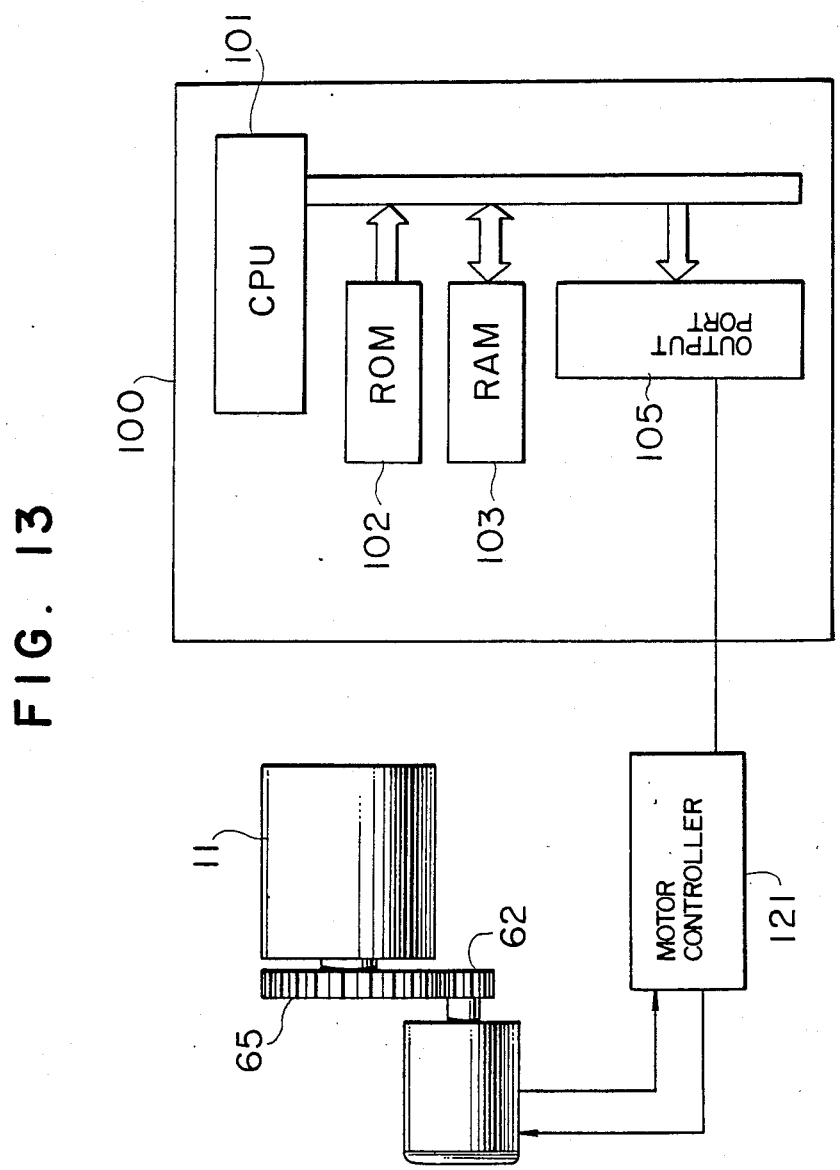
FIG. 13 shows the peripheral devices used with the photosensitive drum of a fifth embodiment of the present invention apparatus in schematic form and its control circuit in block diagram.
Figure 14:
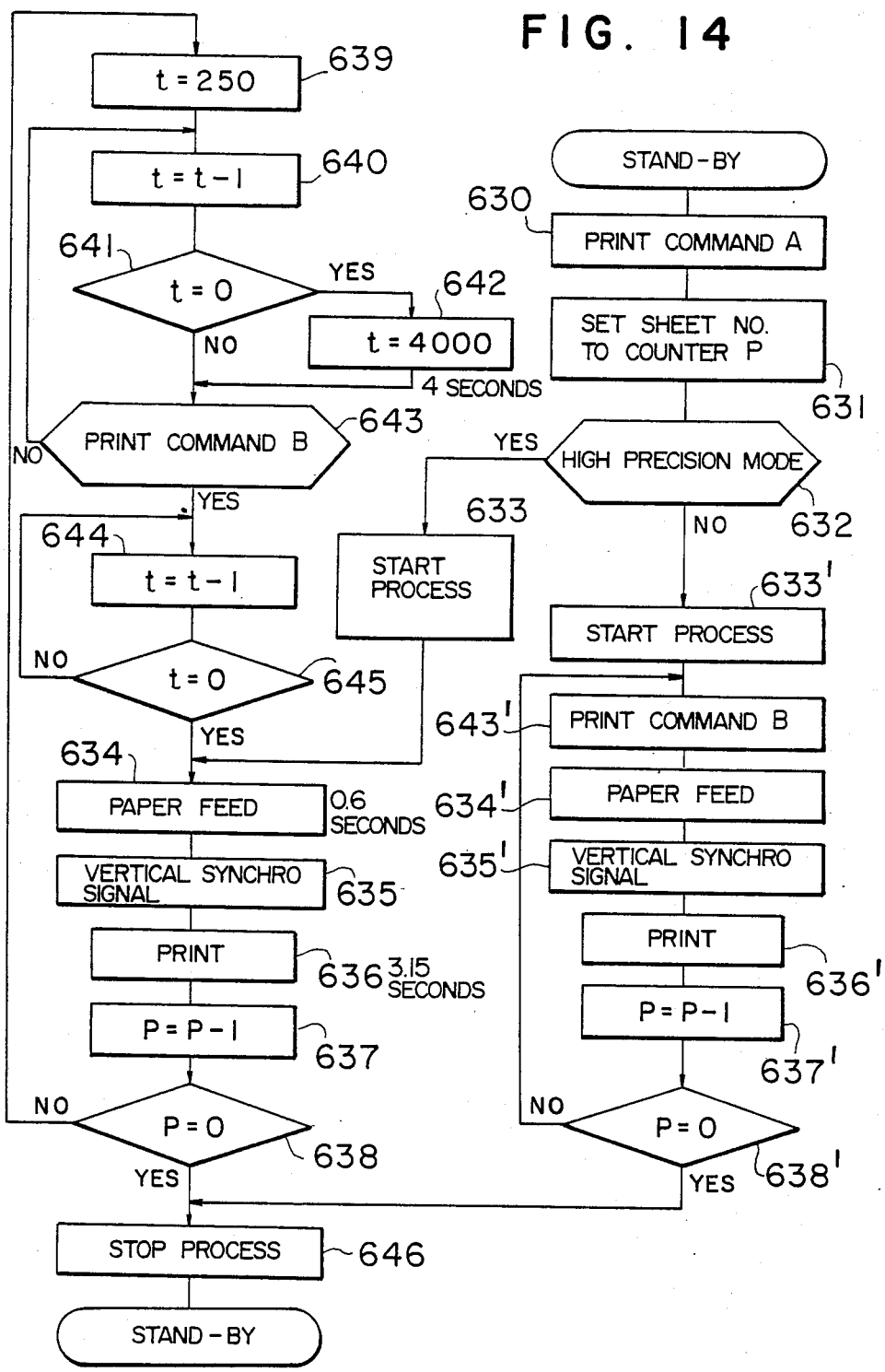
FIG. 14 is a flow chart illustrating the print control in the fifth embodiment.

The fifth embodiment of this invention is shown in FIGS. 13 and 14. In this embodiment, there are not provided position detection means for the photosensitive drum 11, and external means for detecting the time required for one revolution of the photosensitive drum 11, but the time required for one revolution of the photosensitive drum 11 is supervised based on the program in ROM 102 to thereby estimate a certain position of the photosensitive drum 11 and start printing at that position.

According to the first embodiment of this invention, the time required for one revolution of the photosensitive drum is 4 seconds, the time required for feeding a recording sheet is 0.6 seconds, and the time required for printing A4 size recording sheet in the paper feed direction is 3.15 seconds. The print command includes a print command A and print command B. The print command A includes the information on mode setting and the number of print sheets. The print command B merely indicates a print start. When the print command A is received at process step 630, the information on the number of print sheets is set in the counter P on RAM 103 at process step 631. It is checked at process step 632 if the selected mode is the high precision mode. If the selected mode is the high precision mode, a start process is initiated at process step 633. The first recording sheet is fed at process step 634, and a vertical synchro signal is supplied at process step 635. It takes 3.15 seconds from when the vertical synchro signal was supplied to when the printing is completed (process step 636). After completion of printing the first recording sheet, the value of the counter P is decremented by 1 (process step 637). If the value of the counter P is not zero at process step 638, a counter t is set with 250 without stopping the motor (process step 639). The value 250 is reduced by one every one mili-second (process step 640). If the value of the counter t is zero at process step 641, the counter t is set with 4000 at process step 642. If the print command B is not received at process step 643, the processes from process step 640 to process step 643 are repeated until the print command B is received. Upon receipt of the print command B, the control advances to process step 644 whereat the value of the counter t is reduced by one every one mili-second until it becomes zero (process steps 644 and 645). When the value of the counter becomes zero, the control advances to process step 634 to start feeding a recording sheet. After the lapse of 0.6 seconds, a vertical synchro signal is supplied at process step 635. The time from the start of printing the first recording sheet to the start of printing the second recording sheet is given by:

3.15+0.25+0.6=4 seconds (for one revolution of the photosensitive drum without process step 642 between the process steps 640 and 643) and 3.15+0.25+4+0.6=8 seconds (for two revolutions of the photosensitive drum with process step 642).

The processes from process step 634 to process step 645 are repeated for the printing operation until the value of the counter P becomes zero. When the value becomes zero, the control advances to process step 646 whereat a stop process is executed to stop the motor and terminate the printing operation.

The write start position of the photosensitive drum 11 can thus be always set at a fixed position during consecutive printing operations. In the case of feeding an A4 size recording sheet in the paper feed direction, the counter t is set with 250 at process step 639 after completion of printing. However, this set value changes in accordance with the size of the recording sheet. For example, in the case of feeding a B4 size recording sheet in the paper feed direction, the printing time is 3.85 seconds, so that the counter t is set with 3550.

3.85+3.55+0.6=8 seconds (two revolutions of the photosensitive drum)

In the case of feeding an A3 size recording sheet in the paper feed direction, the printing time is 4.46 seconds, so that the counter t is set with 2940.

4.46+2.94+0.6=8 seconds (two revolutions of the photosensitive drum)

Figure 15:
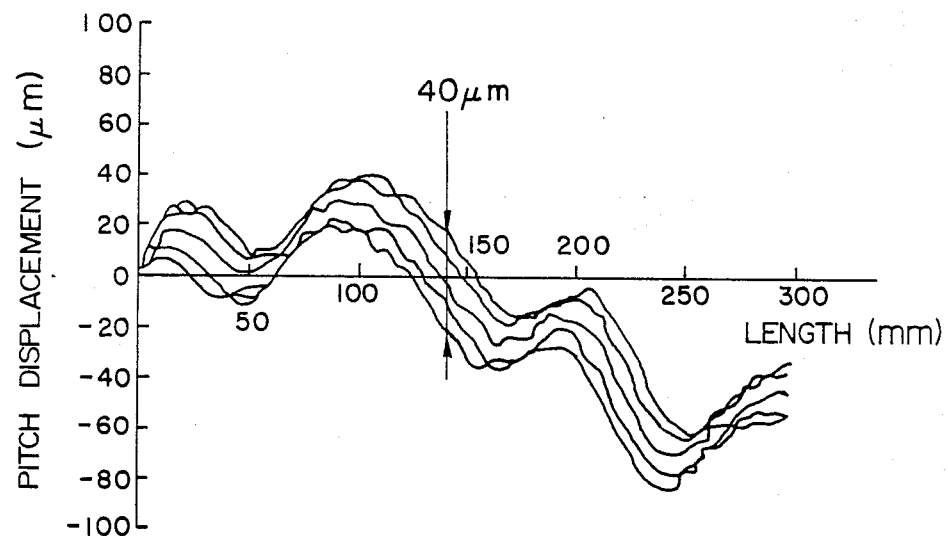
FIG. 15 is a graph showing the characteristic of print pitch fluctuation in the fifth embodiment.

In this embodiment, there is a small time difference between the time required for one revolution of the motor 61 and the one cycle time of a reference clock of CPU 101. FIG. 15 shows the case where there is a time difference of 0.01 seconds between one revolution of the photosensitive drum 11 and one cycle of the program. Since a single recording sheet is printed during two revolutions of the photosensitive drum 11, printing on the fifth recording sheet starts from the position displaced by 7.2 degrees (7.54 mm on the photosensitive drum) from the print start position on the first recording sheet. The print pitch displacement is 40 microns at a maximum which is difficult to be visually recognized, thus leaving no problem.

In the ordinary mode, as shown by the processes from process step 633' to process step 636', the second and following recording sheets 41 are fed immediately upon receipt of the print command B without using the counter 1, and a vertical synchro signal is supplied to the host 140 to start printing.

According to this embodiment, the write start position can be set substantially at the same position by using only programs, thus realizing a cost effective apparatus.

Figure 16:
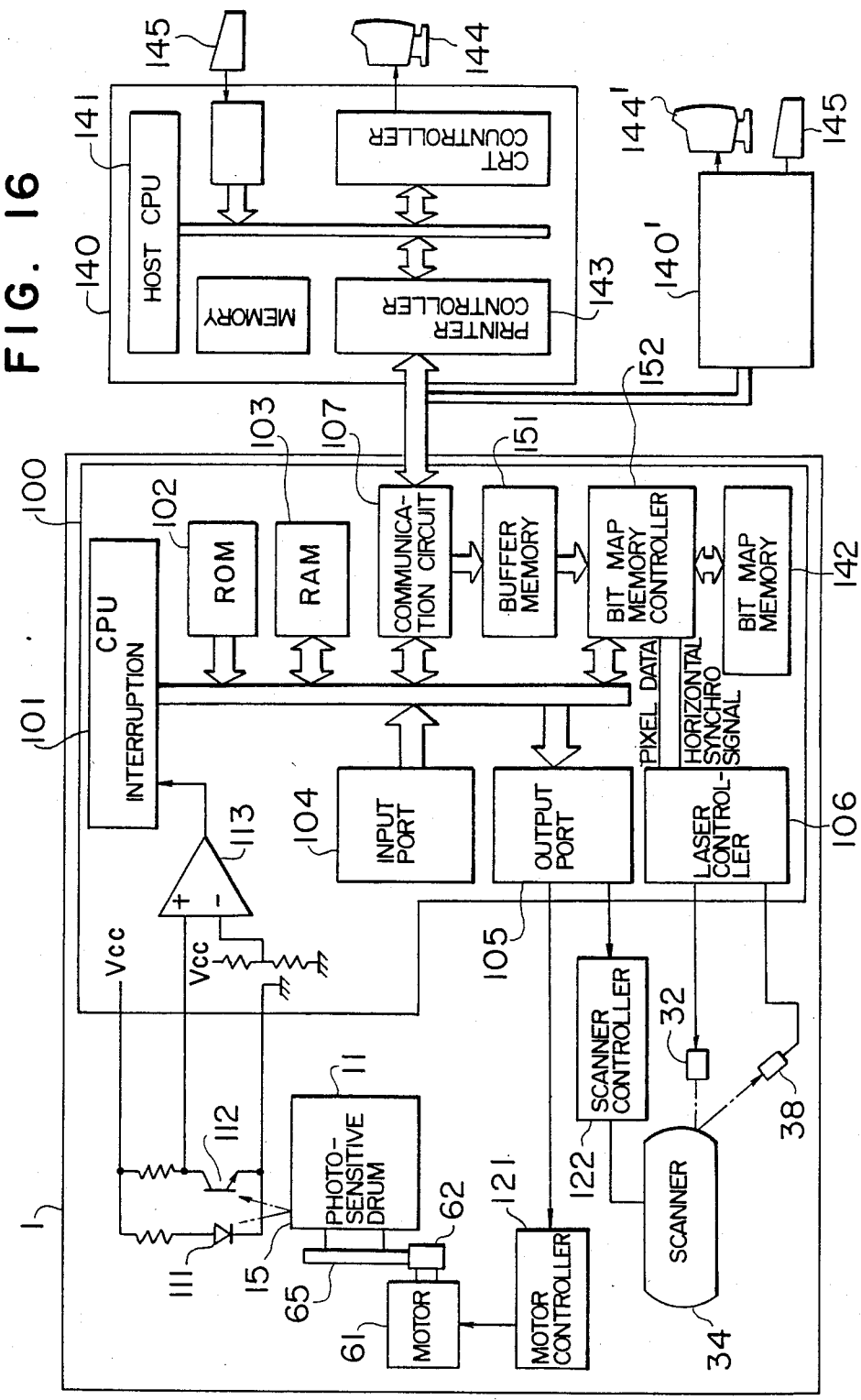
FIG. 16 is a block diagram showing the control circuit used in a sixth embodiment of the present invention apparatus.

The sixth embodiment of this invention is shown in FIG. 16. In this embodiment, there are provided, within the control unit 100 of the printer 1, a buffer memory 151, bit map memory controller 152, and bit map memory 142. Coded document information is supplied from the host 140. The printer 1 is arranged to be connectable to a plurality of hosts 140, 140'.

When an operator instructs to start a print operation from the keyboard 145, the host CPU 141 sends a print command via the printer controller 143 to the printer 1. After the printer responds to the print command, document information (document/graphics data) is sent via the communication circuit 107 into the buffer memory 151. The end of the document information is attached with a code representative of the information end. Upon receipt of this code, CPU 101 instructs the bit map memory controller 152 to start developing the document information. The bit map memory controller 152 develops the document information in the buffer memory 151 into the bit map memory 142 in the form of pixel data. After this development, CPU 101 causes the printer to start printing. The printing procedure is similar to the first embodiment so that the detailed description is omitted. An interruption signal (vertical synchro signal) from the light receiving element 112 and a horizontal synchro signal are sent to the bit map memory controller 152 which in accordance with the vertical and horizontal synchro signals, sends the pixel data in the bit map memory 142 to the laser controller 106 to print them. If there is the next page to be printed, upon completion of the development from the buffer memory 151 to the bit map memory 142, a development completion signal is sent to the host 140 to receive the next page document information therefrom.

In this embodiment, the light receiving element 112 has been used as the position detection means for the photosensitive drum 11. The position detection means such as shown in the third to fifth embodiments ma also be used.

A part of the communication circuit 107, buffer memory 151, bit map memory controller 152 and bit map memory 142 may be integrally mounted outside of the printer.

According to this embodiment, there is no need for a plurality of hosts to have the bit map memory 142, thus realizing a cost effective system. Further, a document such as a postscript can be printed with high quality without any uneven image portion.

As appreciated from the foregoing description of the present invention, print pitch fluctuation is made minimum for all recording sheets so that a plurality of printing matters can be obtained with high quality and with less print pitch fluctuation.

We claim:

1. A high precision image recording apparatus comprising:
   electrophotographic means having at least a cylindrical photosensitive drum rotatively supported, and exposure means, for forming a toner image on the surface of said photosensitive drum;
   a recording sheet feed/transport unit for feeding and transporting a recording sheet to which said toner image formed on the surface of said photosensitive drum is transferred;
   transfer means for transferring said toner image on said photosensitive drum to said recording sheet fed and transported by said recording sheet feed/transport unit; and
   a drive unit for driving said photosensitive drum and recording sheet feed/transport unit; wherein
   said drive unit is provided with a motor coupled to said photosensitive drum via a rotation transmission mechanism having a speed reduction ratio of 1/integer number (inclusive of 1/1); and
   said exposure means is provided with recording start position control means for starting recording image information from a predetermined fixed reference position on said photosensitive drum.

2. A high precision image recording apparatus according to claim 1, wherein said recording start position control means sets as said reference position on said photosensitive drum the recording start position of a first page of image information on said photosensitive drum, and starts recording a second page of image information using said reference position as a basis.

3. A high precision image recording apparatus according to claim 1, wherein said recording start position control means starts recording the second and following pages of image information from the position within 45 degrees from said reference position.

4. A high precision image recording apparatus according to claim 2, wherein said recording start position control means starts recording the second and following pages of image information from the position within 45 degrees from said reference position.

5. A high precision lmage recording apparatus comprising:
   electrophotographic means having at least a cylindrical photosensitive drum rotatively supported, and exposure means, for forming a toner image on the surface of said photosensitive drum;
   a recording sheet feed unit for feeding a recording sheet to which said toner image formed on the surface of said photosensitive drum is transferred;
   a recording sheet transport unit for transporting said fed recording sheet;
   transfer means for transferring said toner image on said photosensitive drum to said recording sheet fed and transported by said recording sheet feed and transport units; and
   a drive unit for driving said photosensitive drum and recording sheet feed and transport units; wherein
   said drive unit is provided with a motor coupled to said photosensitive drum and recording sheet transport unit via a rotation transmission mechanism having a speed reduction ratio of 1/integer number (inclusive of 1/1); and
   said exposure means is provided with recording start position control means for starting recording image information from a predetermined fixed reference position on said photosensitive drum.

6. A high precision image recording apparatus according to claim 5, wherein said recording start position control means sets as said reference position on said photosensitive drum the recording start position of a first page of image information on said photosensitive drum, and starts recording a second page of image information using said reference position as a basis.

7. A high precision image recording apparatus according to claim 5, wherein said recording start position control means starts recording the second and following pages of image information from the position within 45 degrees from said reference position.

8. A high precision image recording apparatus according to claim 6, wherein said recording start position control means starts recording the second and following pages of image information from the position within 45 degrees from said reference position.

9. A high precision lmage recording apparatus according to claim 5, wherein said drive unit is provided with said motor coupled to said photosensitive drum and to recording sheet transport unit via said rotation transmission mechanism, and the speed reduction ratio of said rotation transmission mechanism is 1:n where the relationship between 1 and an integer 1 closest to n satisfies the following formula $$|n-m| \leq 0.125$$

10. A high precision image recording apparatus comprising:
    electrophotographic means having at least a cylindrical photosensitive drum rotatively supported, and exposure means, for forming a toner image on the surface of said photosensitive drum;
    a recording sheet feed/transport unit for feeding and transporting a recording sheet to which said toner image formed on the surface of said photosensitive drum is transferred;
    transfer means for transferring said toner image on said photosensitive drum to said recording sheet fed and transported by said recording sheet feed/transport unit; and
    a drive unit for driving said photosensitive drum and recording sheet feed/transport unit; wherein
    said drive unit is provided with a motor coupled to said photosensitive drum via a rotation transmission mechanism having a speed reduction ratio of 1/integer number (inclusive of 1/1); and
    said exposure means is provided with first recording start position control means for starting recording image information from a predetermined fixed reference position on said photosensitive drum, second recording start position control means for starting recording image from an arbitrary position on said photosensitive drum, and mode switching means for selectively actuating one of said first and second recording start position control means.

11. A high precision image recording apparatus according to claim 10, wherein said mode switching means selectively actuates one of said first and second recording start position control means in response to a control signal from image information signal generating means for generating an image information to be recorded.

12. A high precision image recording apparatus comprising:
electrophotographic means having at least a cylindrical photosensitive drum rotatively supported, and exposure means, for forming a toner image on the surface of said photosensitive drum;
a recording sheet feed/transport unit for feeding and transporting a recording sheet to which said toner image formed on the surface of said photosensitive drum is transferred;
transfer means for transferring said toner image on said photosensitive drum to said recording sheet fed and transported by said recording sheet feed/transport unit; and
a drive unit for driving said photosensitive drum and recording sheet feed/transport unit; wherein
said drive unit is provided with a motor coupled to said photosensitive drum via a rotation transmission mechanism having a speed reduction ratio of 1/integer number (inclusive of 1/1), said motor being separately mounted from said recording sheet feed/transport unit; and
said exposure means is provided with recording start position control means for starting recording image information from a predetermined fixed reference position on said photosensitive drum.

13. A high precision image recording apparatus according to claim 12, wherein said recording sheet feed/transport unit comprises recording sheet extracting means for extracting a recording sheet from a paper cassette accommodating a plurality of recording sheets, and recording sheet position aligning and supplying means for supplying said extracted recording sheet in position alignment with said toner image formed on said photosensitive drum, and
said motor provided for said drive unit is separately mounted from said recording sheet extracting means and recording sheet position aligning and supplying means.

14. A high precision image recording apparatus comprising:
electrophotographic means having at least a cylindrical photosensitive drum rotatively supported, and exposure means, for forming a toner image on the surface of said photosensitive drum;
a recording sheet feed/transport unit for feeding and transporting a recording sheet to which said toner image formed on the surface of said photosensitive drum is transferred;
transfer means for transferring said toner image on said photosensitive drum to said recording sheet fed and transported by said recording sheet feed/transport unit; and
a drive unit for driving said photosensitive drum and recording sheet feed/transport unit; wherein
said drive unit is provided with a motor coupled to said photosensitive drum via a rotation transmission mechanism having a speed reduction ratio of 1:n where the relationship between and an integer 1 closest to n satisfies the following formula:

$$|n-m| \leqq 0.125, \text{ and}$$

said exposure means is provided with recording start position control means for starting recording image information from a predetermined fixed reference position on said photosensitive drum.

15. A high precision image recording apparatus according to claim 14, wherein said exposure means is provided with first recording start position control means for starting recording image information from a predetermined fixed reference position on said photosensitive drum, second recording start position control means for starting recording image from an arbitrary position on said photosensitive drum, and mode switching means for selectively actuating one of said first and second recording start position control means.

16. A high precision image recording apparatus according to claim 15, wherein said mode switching means selectively actuates one of said first and second recording start position control means in response to a control signal from image information signal generating means for generating an image information to be recorded.

17. A high precision image recording apparatus comprising:
electrophotographic means having at least a cylindrical photosensitive drum rotatively supported, and exposure means, for forming a toner image on the surface of said photosensitive drum;
a recording sheet feed/transport unit for feeding and transporting a recording sheet to which said toner image formed on the surface of said photosensitive drum is transferred;
transfer means for transferring said toner image on said photosensitive drum to said recording sheet fed and transported by said recording sheet feed/transport unit; and
a drive unit for driving said photosensitive drum and recording sheet feed/transport unit; wherein
said drive unit is provided with a motor coupled to said photosensitive drum via a rotation transmission mechanism having a speed reduction ratio of 1:1; and
said exposure means is provided with recording start position control means for starting recording image information from a predetermined fixed reference position on said photosensitive drum.

18. A high precision image recording apparatus according to claim 17, wherein said recording start position control means sets as said reference position on said photosensitive drum the recording start position of a first page of image information on said photosensitive drum, and starts recording a second page of image information using said reference position as a basis.

19. A high precision image recording apparatus according to claim 17, wherein said recording start position control means starts recording the second and following pages of image information from the position within 45 degrees from said reference position.

20. A high precision image recording apparatus according to claim 18, wherein said recording siart position control means starts recording the second and following pages of image information from the position within 45 degrees from said reference position.

21. A high precision image recording apparatus comprising:

electrophotographic means having at least a cylindrical photosensitive drum rotatively supported, and exposure means, for forming a toner image on the surface of said photosensitive drum;

a recording sheet feed/transport unit for feeding and transporting a recording sheet to which said toner image formed on the surface of said photosensitive drum is transferred;

transfer means for transferring said toner image on said photosensitive drum to said recording sheet fed and transported by said recording sheet feed/transport unit; and a drive unit for driving said photosensitive drum and recording sheet feed/transport unit; wherein said drive unit is provided with a motor coupled to said photosensitive drum via a rotation transmission mechanism having a speed reduction ratio of 1/integer number (inclusive of 1/1); and said exposure means is provided with recording start position control means for starting recording image information from a predetermined fixed reference position on said photosensitive drum, said recording start position control means comprising rotation-response type pulse generating means coupled to said photosensitive drum and said rotation transmission mechanism including said motor, and counter means for counting a pulse signal outputted from said pulse generating means.

22. A high precision image recording apparatus comprising:

electrophotographic means having at least a cylindrical photosensitive drum rotatively supported, and exposure means, for forming a toner image on the surface of said photosensitive drum;

a recording sheet feed/transport unit for feeding and transporting a recording sheet to which said toner image formed on the surface of said photosensitive drum is transferred;

transfer means for transferring said toner image on said photosensitive drum to said recording sheet fed and transported by said recording sheet feed/transport unit; and a drive unit for driving said photosensitive drum and recording sheet feed/transport unit; wherein said drive unit is provided with a motor coupled to said photosensitive drum via a rotation transmission mechanism having a speed reduction ratio of 1/integer number (inclusive of 1/1), an encoder responsive to the rotation of said motor, and speed control means for controlling to rotate said motor at a constant speed while referring to said pulse signal outputted from said encoder, and said exposure means is provided with recording start position control means for starting recording image information from a predetermined fixed reference position on said photosensitive drum, said recording start position control means being constructed of counter means for counting a pulse signal outputted from said encoder.

23. A high precision image recording apparatus comprising:

electrophotographic means having at least a cylindrical photosensitive drum rotatively supported, and exposure means, for forming a toner image on the surface of said photosensitive drum;

a recording sheet feed/transport unit for feeding and transporting a recording sheet to which said toner image formed on the surface of said photosensitive drum is transferred;

transfer means for transferring said toner image on said photosensitive drum to said recording sheet fed and transported by said recording sheet feed/transport unit; and a drive unit for driving said photosensitive drum and recording sheet feed/transport unit; wherein said drive unit is provided with a motor coupled to said photosensitive drum via a rotation transmission mechanism having a speed reduction ratio of 1/integer number (inclusive of 1/1), and said exposure means is provided with recording start position control means for starting recording image information from a predetermined fixed reference position on said photosensitive drum, said recording start position control means being constructed such that the recording start timing for a first page of image information on said photosensitive drum is set at said reference position, and the recording start timing for a second page of image information is controlled by counter means which uses as a count reference said record start timing for said first page.

24. A high precision image recording apparatus according to claim 23, wherein said recording start position control means starts recording the second and following pages of image information from the position within 45 degrees from said reference position.

25. A high precision image recording apparatus comprising:

electrophotographic means having at least a cylindrical photosensitive drum rotatively supported, and exposure means, for forming a toner image on the surface of said photosensitive drum;

a recording sheet feed/transport unit for feeding and transporting a recording sheet to which said toner image formed on the surface of said photosensitive drum is transferred;

transfer means for transferring said toner image on said photosensitive drum to said recording sheet fed and transported by said recording sheet feed/transport unit;

a drive unit for driving said photosensitive drum and recording sheet feed/transport unit; and an image information signal generator for supplying an image information signal to said exposure unit; wherein said drive unit is provided with a motor coupled to said photosensitive drum via a rotation transmission mechanism having a speed reduction ratio of 1/integer number (inclusive of 1/1); and said exposure means is provided with recording start position control means for generating a synchro signal requesting said image information signal generator to generate an image information signal at a predetermined fixed reference position on said photosensitive drum.

26. A high precision image recording apparatus according to claim 25, wherein said image information signal generator generates an image information signal in units of pixel.

27. A high precision image recording apparatus according to claim 25, wherein said image information signal generator comprises memory means having a memory capacity for storing image information signals in units of pixel to be recorded on a single recording sheet, and output means for reading said image information signals from said memory means and outputting said signals, respectively in response to said synchro signal.

28. A high precision image recording apparatus comprising:
- electrophotographic means having at least a cylindrical photosensitive drum rotatively supported, and exposure means, for forming a toner image on the surface of said photosensitive drum;
- a recording sheet feed/transport unit for feeding and transporting a recording sheet to which said toner image formed on the surface of said photosensitive drum is transferred;
- transfer means for transferring said toner image on said photosensitive drum to said recording sheet fed and transported by said recording sheet feed/transport unit;
- a drive unit for driving said photosensitive drum and recording sheet feed/transport unit; and
- communication means for receiving an image information signal from an external image information signal generator and supplying said received image information signal to said exposure unit; wherein
- said drive unit is provided with a motor coupled to said photosensitive drum via a rotation transmission mechanism having a speed reduction ratio of 1/integer number (inclusive of 1/1); and
- said exposure means is provided with recording start position control means for generating a synchro signal requesting, via said communication means, said image information signal generator to generate an image information signal at a predetermined fixed reference position on said photosensitive drum.

29. A high precision image recording apparatus according to claim 28, wherein said exposure means is provided with first recording start position control means for generating a synchro signal requesting, via said communication means, said image information signal generator to generate an image information signal at a predetermined fixed reference position on said photosensitive drum, second recording start position control means for generating a synchro signal requesting, via said communication means, said image information signal generator to generate an image information signal at an arbitrary position on said photosensitive drum, and mode switching means for selectively actuating one of said first and second recording start position control means.

30. A high precision image recording apparatus according to claim 29, wherein said mode switching means selectively actuates one of said first and second recording start position control means in response to a control signal from an external image information signal generator which generates an image information signal to be recorded.

* * * * *